(12) United States Patent
Aoki et al.

(10) Patent No.: US 10,870,168 B2
(45) Date of Patent: Dec. 22, 2020

(54) LASER MACHINING ROBOT SYSTEM

(71) Applicant: FANUC CORPORATION, Yamanashi (JP)

(72) Inventors: Toshimichi Aoki, Yamanashi (JP); Masanobu Hatada, Yamanashi (JP); Takayoshi Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 16/012,145

(22) Filed: Jun. 19, 2018

(65) Prior Publication Data

US 2019/0009360 A1 Jan. 10, 2019

(30) Foreign Application Priority Data

Jul. 4, 2017 (JP) .................................. 2017-131426

(51) Int. Cl.
*B23K 26/046* (2014.01)
*B23K 26/06* (2014.01)
(Continued)

(52) U.S. Cl.
CPC .......... *B23K 26/046* (2013.01); *B23K 26/048* (2013.01); *B23K 26/06* (2013.01);
(Continued)

(58) Field of Classification Search
CPC ...... B23K 26/03; B23K 26/046; B23K 26/06; B23K 26/28; B23K 26/0884; B23K 26/30;
(Continued)

(56) References Cited

U.S. PATENT DOCUMENTS 4,587,608 A * 5/1986 Kishi ............... G05B 19/40936
700/182
5,227,978 A * 7/1993 Kato .................... G05B 19/408
318/573
(Continued)

FOREIGN PATENT DOCUMENTS

CN 1830613 9/2006
CN 101142052 3/2008
(Continued)

OTHER PUBLICATIONS

Office Action dated Jul. 26, 2019 in CN Patent Application No. 201810713050.2.
(Continued)

*Primary Examiner* — Ibrahime A Abraham
*Assistant Examiner* — Gyounghyun Bae
(74) *Attorney, Agent, or Firm* — Wenderoth, Lind & Ponack, L.L.P.

(57) ABSTRACT

A laser machining robot system that simplifies programming of a scanner operation is provided. A laser machining robot system includes a robot controller that controls a robot that performs remote laser machining and a scanner controller that controls a scanner. The robot controller includes: a machining information input unit that inputs machining information; a G-code generation unit that generates a G-code program using the machining information; and a G-code communication unit that transmits the G-code program to the scanner controller. The scanner controller includes a scanner program processing unit that applies the G-code program as a scanner operation program for operating the scanner.

5 Claims, 16 Drawing Sheets

(51) Int. Cl.

| | |
|---|---|
| *B23K 26/08* | (2014.01) |
| *B23K 26/082* | (2014.01) |
| *B23K 26/28* | (2014.01) |
| *B25J 9/16* | (2006.01) |
| *B23K 37/02* | (2006.01) |
| *B23K 26/30* | (2014.01) |
| *B23K 26/04* | (2014.01) |
| *B23K 26/0622* | (2014.01) |

(52) U.S. Cl.
CPC ........ *B23K 26/0622* (2015.10); *B23K 26/082* (2015.10); *B23K 26/0884* (2013.01); *B23K 26/28* (2013.01); *B23K 26/30* (2013.01); *B23K 37/02* (2013.01); *B25J 9/1664* (2013.01); *G05B 2219/40389* (2013.01)

(58) Field of Classification Search
CPC .... B23K 26/082; B23K 37/02; B23K 26/048; B23K 26/0622; B23K 26/0643; B23K 26/0648; B23K 26/0652; B25J 9/1664; G05B 2219/40389; G05B 2219/45165
USPC .......... 219/121.62, 121.6, 121.61, 219/121.63–121.86; 901/16, 1, 3, 4, 5, 6, 901/8, 9, 14, 30, 44, 45, 46, 47; 700/187, 700/186–195, 302, 303, 194, 250–257, 700/56–66; 318/569, 570, 571–574, 318/568.17, 568.19, 567–579; 718/100–108; 706/57, 46, 45–58, 59, 60, 706/61, 62, 904; 234/72–73, 80, 81, 4, 234/6–7, 13–21, 23, 25–29, 30–34, 234/46–48, 49–50, 51, 52, 53–54, 55–58, 234/59, 60–89, 98, 109–119, 121, 234/122–125, 127, 128–131; 235/411–413, 414–415, 416, 417, 419, 235/420, 462.01–462.07, 462.08–462.19, 235/462.2–473, 145 R, 146, 145 A; 341/1, 8, 10, 2–7, 9–17, 26, 184, 341/173–192
See application file for complete search history.

(56) References Cited

U.S. PATENT DOCUMENTS

| | | | | |
|---|---|---|---|---|
| 5,726,896 | A * | 3/1998 | Jia | G06T 11/203 318/568.13 |
| 5,733,079 | A * | 3/1998 | Jessee | G05B 19/4207 409/117 |
| 6,495,794 | B2 * | 12/2002 | Shi | B29C 33/3842 219/121.72 |
| 6,580,959 | B1 * | 6/2003 | Mazumder | G05B 19/4185 700/112 |
| 7,185,412 | B2 * | 3/2007 | Penick | B25J 9/04 29/560 |
| 7,859,655 | B2 * | 12/2010 | Troy | G01C 1/04 348/169 |
| 8,103,381 | B2 * | 1/2012 | Fukawa | B23K 26/082 700/245 |
| 8,319,145 | B2 * | 11/2012 | Rosario | B23K 15/08 219/121.19 |
| 9,364,995 | B2 * | 6/2016 | Roberts, IV | B29C 64/106 |
| 9,470,911 | B2 * | 10/2016 | Fonte | G06F 16/22 |
| 9,678,499 | B2 * | 6/2017 | Garaas | G05B 19/31 |
| 9,855,698 | B2 * | 1/2018 | Perez | G05B 19/41875 |
| 9,969,153 | B2 * | 5/2018 | Meisner | B33Y 10/00 |
| 10,197,990 | B2 * | 2/2019 | Dew | G05B 19/4097 |
| 2006/0060573 | A1 | 3/2006 | Becker | |
| 2008/0035619 | A1 * | 2/2008 | Hamaguchi | B23K 26/04 219/121.79 |
| 2010/0174407 | A1 * | 7/2010 | Fukawa | B23K 26/04 700/245 |
| 2013/0190898 | A1 | 7/2013 | Shilpiekandula et al. | |
| 2014/0114463 | A1 | 4/2014 | Shilpiekandula et al. | |
| 2017/0031350 | A1 * | 2/2017 | Dew | G05B 19/4097 |

FOREIGN PATENT DOCUMENTS

| | | |
|---|---|---|
| CN | 201552943 | 8/2010 |
| CN | 106853554 | 6/2017 |
| JP | 5-216524 | 8/1993 |
| JP | 9-66377 | 3/1997 |
| JP | 2000-194409 | 7/2000 |
| JP | 2010-214393 | 9/2010 |
| JP | 2018-156469 | 10/2018 |

OTHER PUBLICATIONS

Office Action dated Nov. 25, 2019 in DE Patent Application No. 10 2018 209 546.9.

* cited by examiner

```
G00   X2.5  Y2.5
G03   X-2.5 Y2.5  I-2.5 J0  S3000 F4000.0
G01   X-2.5 Y-2.5 S3000 F4000.0
G03   X2.5  Y-2.5 I2.5  J0  S3000 F4000.0
```

| PARAMETER ID_A (UPPER 4byte) | | PARAMETER ID_A (INTERMEDIATE 4byte) | PARAMETER (LOWER 4byte) |
|---|---|---|---|
| 1 | C-MARK | 1 | MACHINING SPEED |
|   |   | 2 | POWER COMMAND |
|   |   | 3 | DIAMETER |
|   |   | 4 | LENGTH |
| 2 | CIRCLE | 1 | MACHINING SPEED |
|   |   | 2 | POWER COMMAND |
|   |   | 3 | DIAMETER |
|   |   | 4 | OPENING ANGLE |

(A)      (B)

1: L P[1] 100mm/sec CNT100 RMT_LS[CIRCLE01]
2: L P[2] 100mm/sec CNT100
3: L P[3] 100mm/sec CNT100 RMT_LS[CIRCLE02]
4: L P[2] 100mm/sec CNT100

FIG. 12

LASER MACHINING ROBOT SYSTEM

This application is based on and claims the benefit of priority from Japanese Patent Application No. 2017-131426, filed on 4 Jul. 2017, the content of which is incorporated herein by reference.

BACKGROUND OF THE INVENTION

Field of the Invention

The present invention relates to a laser machining robot system.

Related Art

Conventionally, in a system that performs remote laser machining using a robot, an input interface of a scanner controller that controls a scanner and an input interface of robot controller are generally separated. Thus, it is necessary to perform an operation of inputting machining information and an operation of operating the robot separately.

In this regard, Patent Document 1 discloses a laser welding apparatus in which a central control unit controls both a scanner controller and a robot controller, Patent Document 1: Japanese Unexamined Patent Application, Publication No. 2010-214393

SUMMARY OF THE INVENTION

However, in the invention disclosed in Patent Document 1, an operation command transmitted from the central control unit to the scanner controller and an operation command transmitted from the central control unit to the laser welding apparatus are merely processed at the same control speed and the same control intervals, and the scanner controller and the robot controller operate individually and independently. That is, in the invention disclosed in Patent Document 1, it is necessary to perform an operation of inputting machining information and an operation of operating the robot individually and independently.

Moreover, in a scanner controller that performs programming of a scanning operation using G-codes, knowledge about G-code programming is necessary, and an operator of a robot controller must learn G-codes in addition to a robot controller operation method in order to use the scanner controller during laser machining.

Therefore, an object of the present invention is to provide a laser machining robot system that simplifies programming of a scanner operation in a robot system that performs remote laser machining.

(1) A laser machining robot system. (for example, a laser machining robot system 1 to be described later) according to the present invention is a laser machining robot system including a robot controller (for example, a robot controller 5 to be described later) that controls a robot that performs remote laser machining and a scanner controller (for example, a scanner controller 9 to be described later) that controls a scanner, wherein the robot controller includes: a machining information input unit (for example, a machining information input unit 51 to be described later) that inputs machining information; a G-code generation unit (for example, a G-code generation unit 52 to be described later) that generates a G-code program using the machining information; and a G-code communication unit (for example, a G-code communication unit 53 to be described later) that transmits the G-code program to the scanner controller, and the scanner controller includes a scanner program processing unit (for example, a scanner program processing unit 91 to be described later) that applies the G-code program as a scanner operation program for operating the scanner.

(2) In the laser machining robot system according to (1), the robot controller may further include a storage unit (for example, a storage unit 57 to be described later) that stores a template program and the G-code generation unite, may generate the G-code program by editing the template program stored in the storage unit using the machining information.

(3) A laser machining robot system (for example, a laser machining robot system 1A to be described later) according to the present invention is a laser machining robot system including a robot controller (for example, a robot controller 5A to be described later) that controls a robot that performs remote laser machining and a scanner controller (for example, a scanner controller 9A to be described later) that controls a scanner, wherein the robot controller includes: a machining information input unit (for example, a machining information input unit 51 to be described later) that inputs machining information; and a machining information communication unit (for example, a machining information communication unit 58 to be described later) that transmits the machining information to the scanner controller, and the scanner controller includes: a G-code generation unit (for example, a G-code generation unit 96 to be described later) that generates a G-code program using the machining information; and a scanner program processing unit (for example, a scanner program processing unit 91 to be described later) that applies the G-code program as a scanner operation program for operating the scanner.

(4) In the laser machining robot system according to (3), the scanner controller may further include a storage unit (for example, a storage unit 97 to be described later) that stores a template program, and the G-code generation unit may generate the G-code program by editing the template program stored in the storage unit using the machining information.

(5) In the laser machining robot system (for example, a laser machining robot system 1B to be described later) according to any one of (1) to (4), the robot controller (for example, a robot controller 5B to be described later) may further include a robot program processing unit (for example, a robot program processing unit 54B to be described later) that executes a robot operation program for operating the robot, and the robot program processing unit selects the scanner operation program included in the scanner controller (for example, a scanner controller 9B to be described later) and activates the selected scanner operation program.

According to the present invention, it is possible to simplify the programming of a scanner operation in a robot system that performs remote laser machining.

BRIEF DESCRIPTION OF THE DRAWINGS

FIG. 12 is a diagram illustrating an example of a robot program.

DETAILED DESCRIPTION OF THE INVENTION

Hereinafter, embodiments of the present invention will be described with reference to the drawings.
[Overall Configuration of Laser Machining Apparatus]

Figure 1:
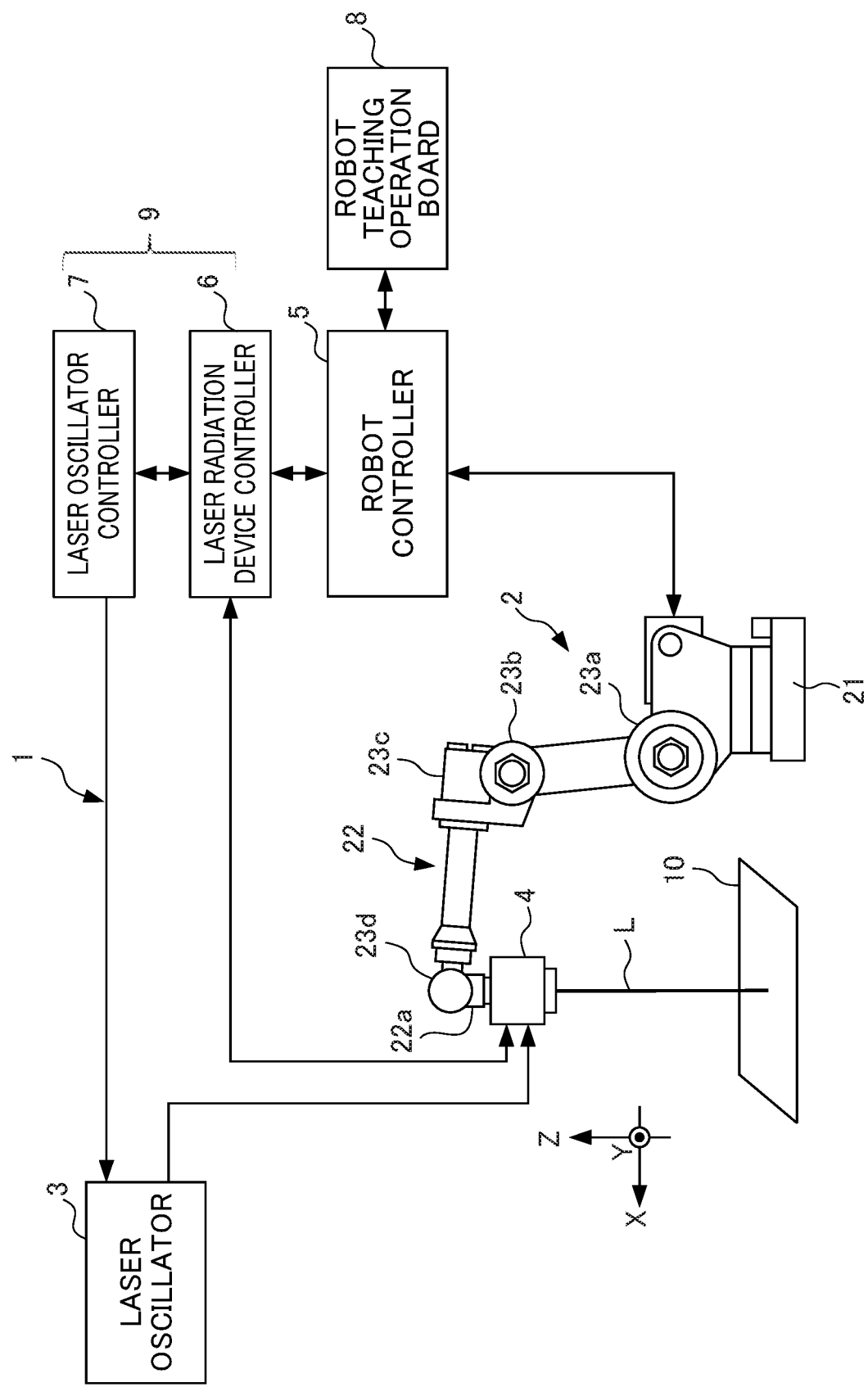
FIG. 1 is a block diagram illustrating an overall configuration of a laser machining robot system according to the present invention.

FIG. 1 is a block diagram illustrating an overall configuration of a laser machining apparatus according to the present invention and illustrates an embodiment of a laser machining robot system 1 configured as a remote laser welding robot system. FIGS. 2 to 4D are diagrams illustrating an optical system of a laser radiation device 4 of the laser machining robot system 1 according to the present invention. An overall configuration of the laser machining robot system 1 illustrated in FIGS. 1 to 4D is common to the respective embodiments to be described later. The laser machining robot system 1 includes a robot. 2, a laser oscillator 3, a laser radiation device 4, a robot controller 5, a laser radiation device controller 6, a laser oscillator controller 7, and a robot teaching operation board 8.

The robot 2 is a multi-joint robot having a plurality of joints and includes a base portion 21, an arm 22, and a plurality of joint, shafts 23a to 23d having a rotating shaft extending in a Y direction. Moreover, the robot 2 includes a plurality of robot servo motors including a robot servo motor (not illustrated) that causes the arm 22 to rotate about a Z direction as an axis of rotation and a robot servo motor (not illustrated) that causes the joint shafts 23a to 23d to rotate to move the arm 22 in an X direction. The robot servo motors are rotated on the basis of driving data transmitted from the robot controller 5 to be described later.

The laser radiation device 4 is fixed to a distal end 22a of the arm 22 of the robot 2. Therefore, the robot 2 can move the laser radiation device 4 in predetermined X and Y directions at a predetermined robot speed according to rotation of the robot servo motors and move the laser radiation device 4 to an arbitrary position on a working space.

The laser oscillator 3 includes a laser medium, an optical resonator, an excitation source, and the like (none of them are illustrated). The laser oscillator 3 generates a laser beam having a laser output based on a laser output command transmitted from the laser oscillator controller 7 to be described later and supplies the generated laser beam to the laser radiation device 4. A fiber laser, a $CO_2$ laser, a YAG laser, and the like may be used as a type of the oscillated laser, and the type of the laser is not particularly limited in the present invention.

Figure 2:
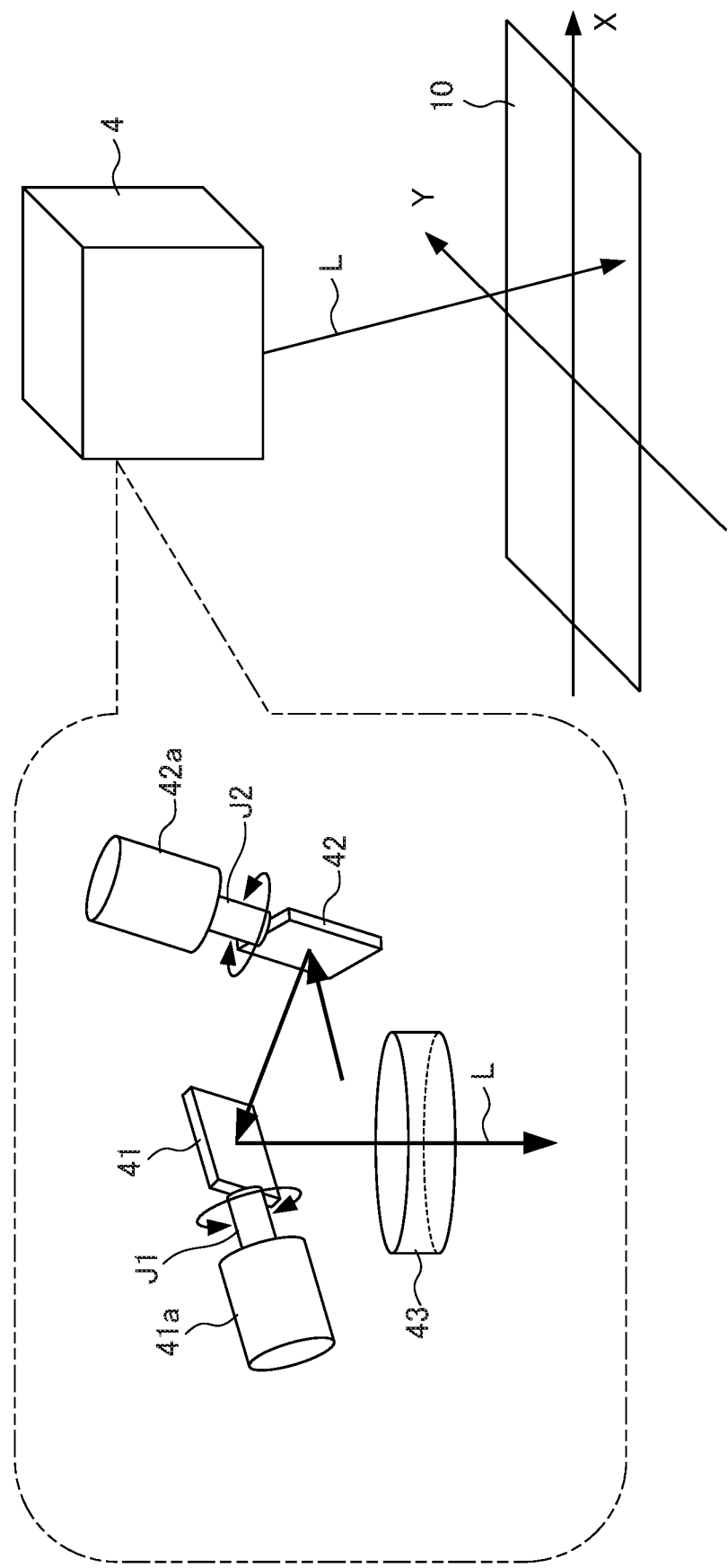
FIG. 2 is a diagram illustrating an optical system of a laser radiation device of the laser machining robot system according to the present invention.

The laser radiation device 4 is a scanner that can receive a laser beam L emitted from the laser oscillator 3 to allow the laser beam L to scan a work 10. As illustrated in FIG. 2, for example, the laser radiation device 4 includes two galvano mirrors 41 and 42 that reflect the laser beam L emitted from the laser oscillator 3, galvano motors 41a and 42a that rotate the galvano mirrors 41 and 42, respectively, and a cover glass 43. A set made up of the laser oscillator 3 and the laser radiation device 4 is sometimes referred to collectively as a "scanner".

The galvano mirrors 41 and 42 can rotate about two orthogonal rotating shafts J1 and J2, respectively. The galvano motors 41a and 42a rotate on the basis of driving data transmitted from the laser radiation device controller 6 to be described later to cause the galvano mirrors 41 and 42 to rotate independently about the rotating shafts J1 and J2.

The laser beam L emitted from the laser oscillator 3 is reflected by the two galvano mirrors 41 and 42 sequentially and is radiated from the laser radiation device 4 to reach a machining point (a welding point) of the work 10. In this case, when the two galvano mirrors 41 and 42 are rotated by the galvano motors 41a and 42a, respectively, an incidence angle of the laser beam L entering these galvano mirrors 41 and 42 changes continuously. As a result, the laser beam L radiated from the laser radiation device 4 scans the work 10 along a predetermined path, and a welding trajectory is formed on the work 10 along the scanning path of the laser beam L.

The scanning path of the laser beam L radiated from the laser radiation device 4 to the work 10 can be changed arbitrarily in the X and Y directions by controlling the rotation of the galvano motors 41a and 42a appropriately to change the rotation angles of the galvano mirrors 41 and 42.

The cover glass 43 has a cylindrical form and has a function of passing the laser beam L reflected sequentially from the galvano mirrors 41 and 42 to move toward the work 10 and protecting the inner part of the laser radiation device 4.

Figure 3:
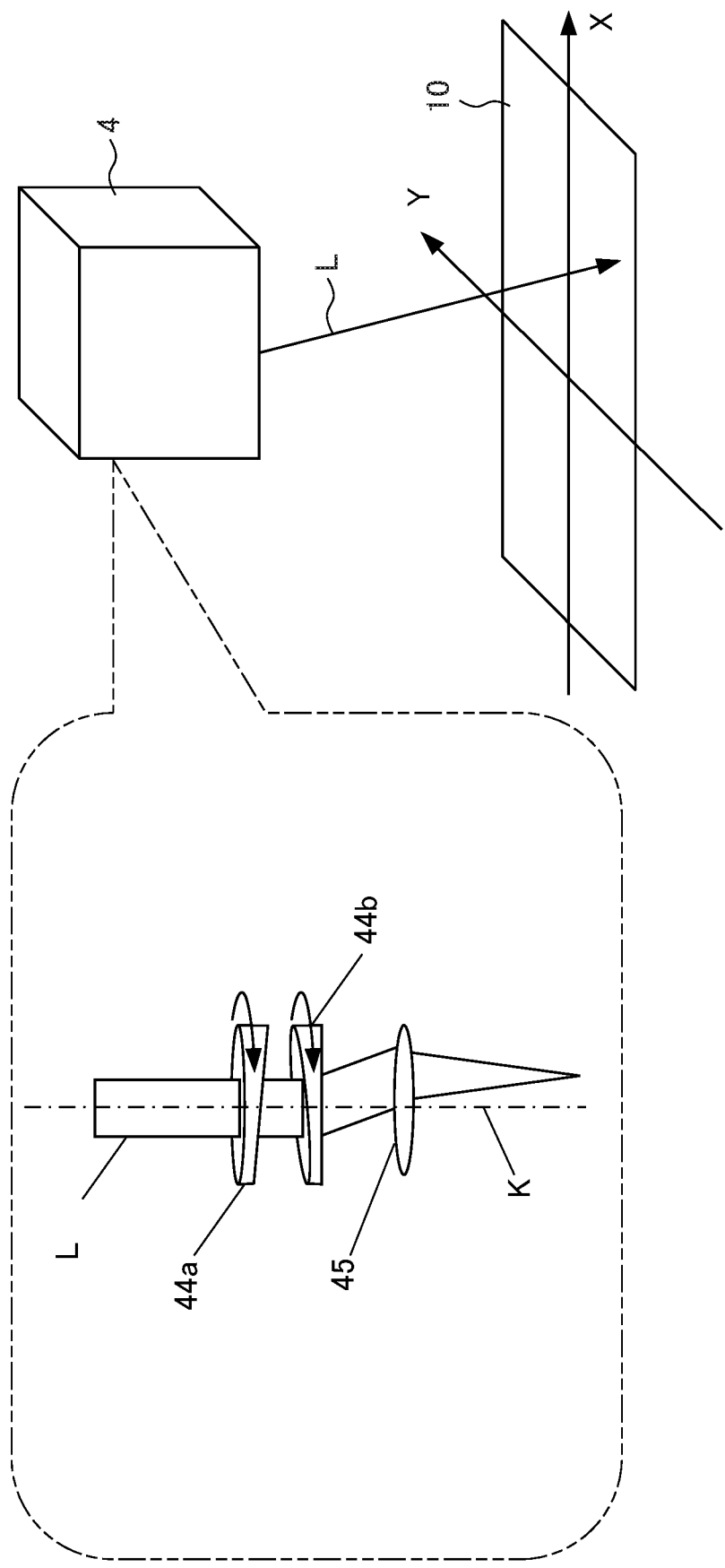
FIG. 3 a diagram illustrating an optical system of a laser radiation device of the laser machining robot system according to the present invention.
Figure 4A:
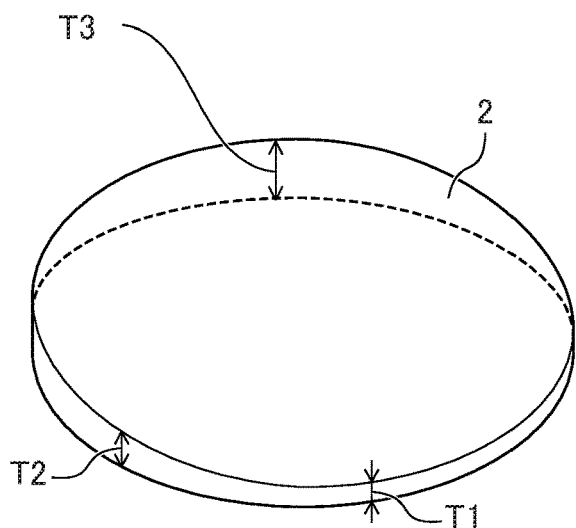
FIG. 4A is a diagram illustrating an optical system of a laser radiation device of the laser machining robot system according to the present invention.
Figure 4B:
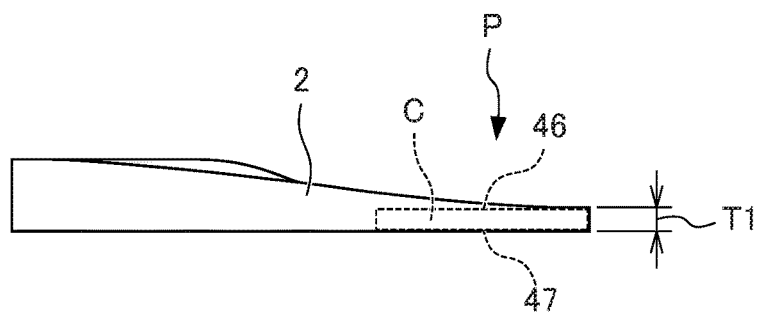
FIG. 4B is a diagram illustrating an optical system of a laser radiation device of the laser machining robot system according to the present invention.
Figure 4C:
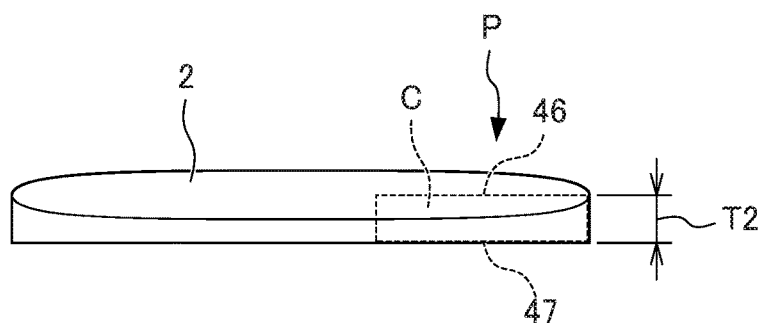
FIG. 4C is a diagram illustrating an optical system of a laser radiation device of the laser machining robot system according to the present invention.
Figure 4D:
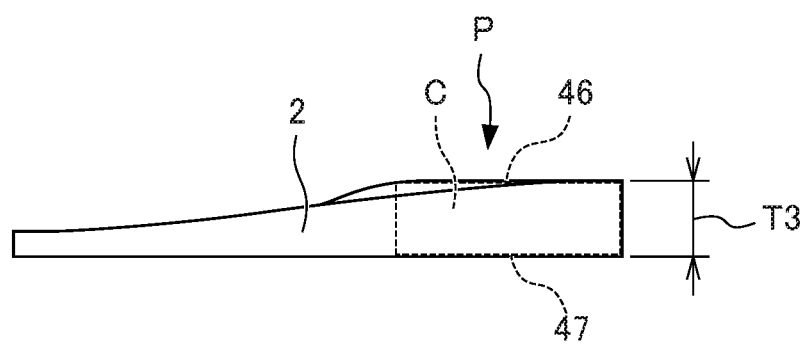
FIG. 4D is a diagram illustrating an optical system of a laser radiation device of the laser machining robot system according to the present invention.

Alternatively, as illustrated in FIG. 3, the laser radiation device 4 may be a trepanning head. In this case, for example, the laser radiation device 4 may have such a configuration that a lens having an inclined surface is rotated by a motor whereby an incident laser beam is refracted and radiated to an arbitrary position.

Specifically, in the laser radiation device 4, two prism lenses 44*a* and 44*b* (hereinafter sometimes referred to collectively as a "prism lens 44") and a condensing lens 45 are disposed in a superimposed manner so that a laser beam L is incident in a thickness direction, and the two prism lenses 44*a* and 44*b* rotate about a rotating shaft K whereby a radiation position can be controlled to scan a two-dimensional plane.

As illustrated in FIGS. 4A to 4D, the prism lens 44 is formed in a disk form, for example, and a side (hereinafter referred to as an incidence side) 46 on an incidence side of a section C in a thickness T direction and a side (hereinafter referred to as an exit side) 47 on an exit side are parallel to each other. That is, the thickness T of the prism lens 44 is constant in a radial direction thereof. On the other hand, the thickness T of the prism lens 44 changes continuously in a circumferential direction thereof. Specifically, as illustrated in FIGS. 4A to 4D, the thickness T of the prism lens 44 has thicknesses T1~T2~T3, for example, and these thicknesses are in the relation of T1<T2<T3. The prism lens 44 is rotated by a rotating motor and the thickness T changes continuously according to the rotating direction.

The laser beam L incident on the prism lens 44 is refracted according to refractive index of the prism lens 44 and is radiated as a refracted beam. In this case, a beam position of the laser beam L shifted by the refraction has a correlation with the thickness T of the prism lens 44. That is, the larger the thickness T of the prism lens 44 at an incidence position P of the laser beam L, the larger the shift amount, which is a deviation of the beam position of the laser beam L due to refraction. When a laser beam L passes through the prism lens 44, of which the thickness T changes continuously and periodically, in a rotating direction, it is possible to change the beam position of the laser beam L (that is, the radiation position of the laser beam L) continuously and periodically.

The robot controller 5 outputs driving control data to respective robot servo motors of the robot 2 according to a predetermined working program to control an operation of the robot 2. In the laser machining robot system 1 of the present invention, the robot controller 5 outputs laser radiation commands to the laser oscillator controller 7 to be described later. The commands output from the robot controller 5 may include power, frequency, and duty, which are laser radiation conditions. Alternatively, radiation conditions may be stored in advance in a memory inside the laser oscillator controller 7, and the commands output from the robot controller 5 may include which radiation condition is to be selected and radiation start/end timings.

The laser radiation device controller 6 is a controller that performs adjustment of the positions of lenses and mirrors in the mechanism of the laser radiation device 4. The laser radiation device controller 6 may be included in the robot controller 5.

The laser oscillator controller 7 is a device that controls the laser oscillator 3 and performs control so that the laser oscillator 3 outputs a laser beam according to a command from the laser radiation device controller 6 or the robot controller 5. The laser oscillator controller 7 may be connected directly to the robot controller 5 as well as being connected to the laser radiation device controller 6. Moreover, the laser oscillator controller 7 may be integrated with the laser radiation device controller 6. The laser radiation device controller 6 and the laser oscillator controller 7 are sometimes referred to collectively as a "scanner controller 9".

The robot teaching operation board 8 is a teaching operation board that is connected to the robot controller 5 and is used by an operator to operate the robot. An operator inputs machining information for performing laser machining via a user interface on the robot teaching operation board 8.

First Embodiment

Next, a more detailed configuration of the robot controller 5, the laser radiation device controller 6, and the laser oscillator controller 7 according to a first embodiment of the present invention will be described with reference to a block diagram illustrated FIG. 5. In the following description, for the sake of convenience, instead of the laser radiation device controller 6 and the laser oscillator controller 7, a scanner controller 9 in which the controllers 6 and 7 are integrated and which controls a scanner (not illustrated) will be described. However, an embodiment of the present invention is not limited thereto, and the laser radiation device controller 6 and the laser oscillator controller 7 may be separate controllers.

Figure 5:
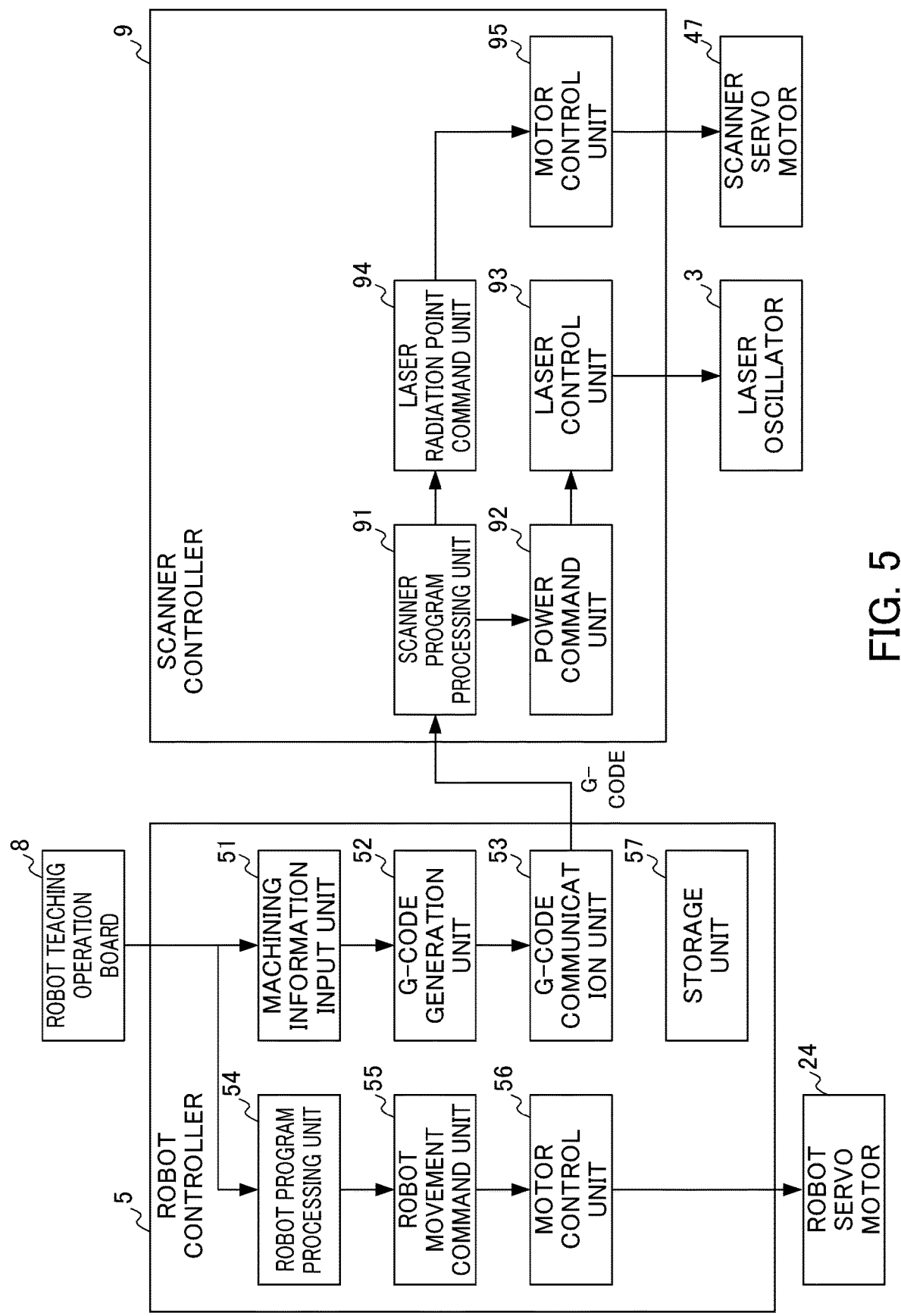
FIG. 5 is a block diagram illustrating a configuration of a robot controller and a scanner controller of a laser machining robot system according to a first embodiment.

FIG. 5 is a block diagram illustrating a configuration of the robot controller 5 and the scanner controller 9 of the laser machining robot system. 1 according to the first embodiment.

The robot controller 5 includes a machining information input unit 51, a G-code generation unit 52, a G-code communication unit 53, a robot program processing unit 54, a robot movement command unit 55, a motor control unit 56, and a storage unit 57.

The machining information input unit 51 is a user interface used for inputting machining information from the robot teaching operation board 8. The machining information input unit 51 outputs machining information input from the robot teaching operation board 8 to the G-code generation unit 52. Here, the machining information is parameters unique to a machining target shape when performing laser machining, and the details thereof will be described later.

The G-code generation unit 52 generates a G-code program using the machining information input from the machining information input unit 51. Here, an example of a method of generating a G-code program on the basis of the machining information will be described in detail with reference to FIGS. 6A and 6B.

Figures 6A, 6B:
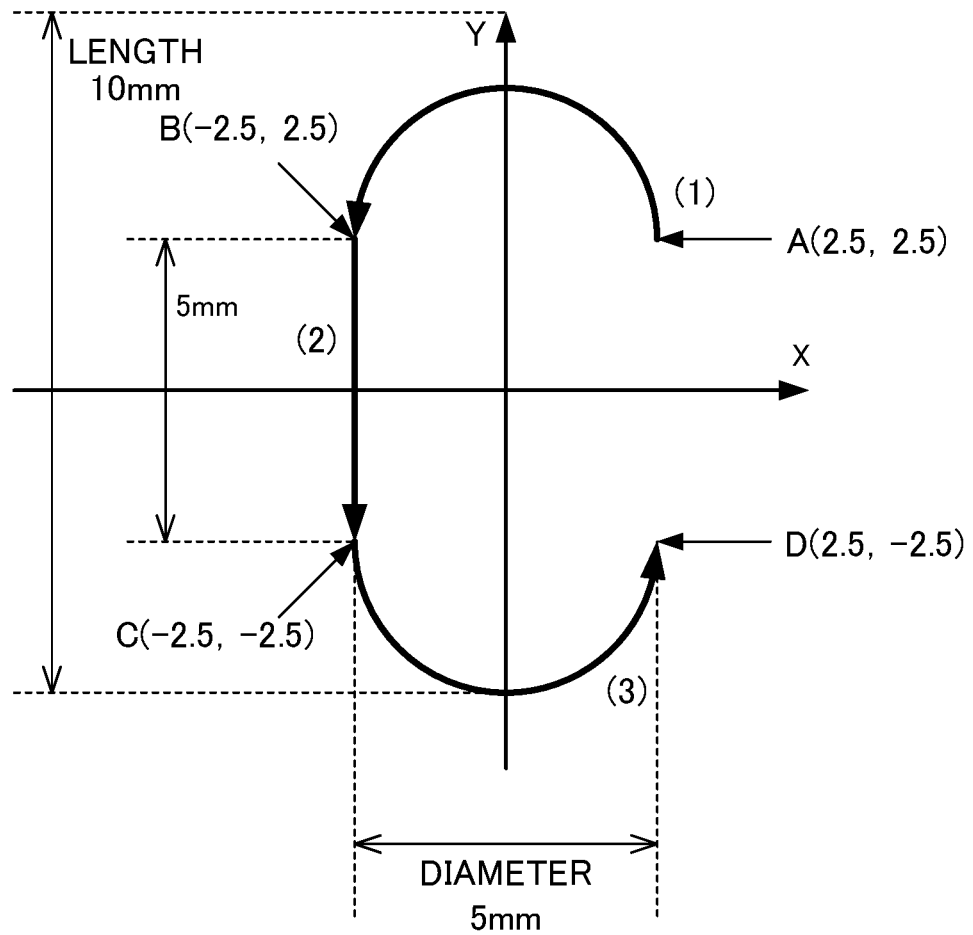
FIG. 6A is a diagram illustrating an example of a laser machining shape.
FIG. 6B is a diagram illustrating an example of a G-code program.

When a C-mark which starts from a point A which is the coordinate of (X,Y)=(2.5, 2.5) and of which the length is 10 mm and the diameter is 5 mm is machined as illustrated in FIG. 6A, the G-code generation unit 52 generates such a G-code program as illustrated in FIG. 6B.

Specifically, "G00" on the first line of the G-code program of FIG. 6B is a command for positioning the point A which is the starting point of the C-mark in FIG. 6A. The subsequent code "X2.5 Y2.5" designates that machining starts from the coordinate of (X,Y)=(2.5, 2.5).

"G03" on the second line is a command for machining an arc in a counter-clockwise direction from the starting point defined on the first line (the point A). The subsequent code "X-2.5 Y2.5" designates an ending point (a point B) of the arc, and the subsequent code "I-2.5 J0" designates a vector that starts from the starting point (the point A) and ends at the center (X, Y)=(0, 2.5) of the arc. Furthermore, "S3000" designates the power [W] of the laser and "F4000.0" designates a machining speed [mm/min].

"G01" on the third line is a command for machining a straight line from a point. B which is an ending of laser machining at an execution time point of the command on the second line. The subsequent code "X-2.5 Y-2.5" designates the coordinate of an ending point (a point C) of the straight line. Furthermore, "S3000" designates the power [W] of laser and "F4000.0" designates a machining speed [mm/min].

"G03" on the fourth line is a command for machining an arc in a counter-clockwise direction from the point C which is an ending point of laser machining at an execution time point of the command on the third line. The subsequent code "X2.5 Y-2.5" defines an ending point. (a point D) of an arc, and "I2.5 J0" designates a vector that starts from the starting point (the point C) and ends at the center (X,Y)=(0, −2.5) of the arc. Furthermore, "S3000" designates the power [W] of laser and "F4000.0" designates a machining speed [mm/min].

That is, when parameters including a starting point coordinate of (X,Y)=(2.5, 2.5), a diameter of 5 [mm], and a length of 10 [mm], a power of 3000 [W], and a machining speed of 4000.0 [mm/min] are input from the machining information input unit 51 to the G-code generation unit 52, the G-code generation unit 52 generates such a G-code program as illustrated in FIG. 6B.

The G-code generation unit 52 may generate a G-code program for realizing a desired machining shape by rewriting and editing a G-code program stored as a template in the storage unit 57 as will be described later.

The G-code communication unit 53 transmits the G-code program output from the G-code generation unit 52 to the scanner program processing unit 91 of the scanner controller 9, connected via a network to the robot controller 5. The transmission may use means such as file transfer protocol (FTP) communication.

The robot program processing unit 54 analyzes a machining program including teaching points input from the robot teaching operation board 8 to the robot controller 5 and generates operation command information related to a moving direction of the laser radiation device 4 and a target robot speed. The generated operation command information is output to the robot movement command unit 55.

The robot movement command unit 55 performs interpolation so that a moving path of the laser radiation device 4 between teaching points becomes a smooth path following a desired machining path on the work 10 on the basis of the operation command information output from the robot program processing unit 54. Furthermore, the robot movement command unit 55 accelerates or decelerates the operation of the robot 2 on the basis of the interpolation information and predetermined parameters and generates driving information of the respective robot servo motors 24 for moving the laser radiation device 4 along a desired machining path. The generated driving information of the respective robot servo motors 24 is output to the motor control unit 56.

The motor control unit 56 generates driving data of the respective robot servo motors 24 on the basis of the driving information output from the robot movement command unit 55 and drives the respective robot servo motors 24 on the basis of the generated driving data.

The storage unit 57 stores a G-code program prepared in advance as a template. The G-code generation unit 52 can generate a G-code program by editing the template of a G-code program stored in the storage unit 57 when generating a G-code program using the machining information input from the robot teaching operation board 8.

The scanner controller 9 includes a scanner program processing unit 91, a power command unit 92, a laser control unit 93, a laser radiation point command unit. 94, and a motor control unit 95.

The scanner program processing unit 91 analyzes the machining program input from the G-code communication unit 53 to the scanner program processing unit 9 and generates operation command information related to a scanning speed and a scanning direction of the laser radiation device 4. The scanner program processing unit 91 outputs the generated operation command information to the laser radiation point command unit 94, generates laser output information of the laser beam L output from the laser radiation device 4, and outputs the generated laser output information to the power command unit 92.

The power command unit 92 generates oscillation information of the laser oscillator 3 so that the laser beam L output from the laser radiation device 4 has a desired laser output on the basis of the laser output information output from the scanner program processing unit 91. The generated oscillation information of the laser oscillator 3 is output to the laser control unit 93.

The laser control unit 93 generates oscillation control data of the laser oscillator 3 on the basis of the oscillation information output from the power command unit 92 and controls the laser oscillator 3 on the basis of the generated oscillation control data. The set made up of the power command unit 92 and the laser control unit 93 corresponds to the laser oscillator controller 7.

First, the laser radiation point command unit 94 calculates a scanning speed and a scanning direction of the laser beam L on the basis of the operation command information output from the scanner program processing unit. 91. Subsequently, the laser radiation point command unit 94 calculates a rotation angle and a rotation speed of the galvano mirrors 41 and 42 or the prism lens 44 on the basis of the calculated scanning speed and scanning direction of the laser beam L. Lastly, the laser radiation point command unit 94 generates driving information of the respective scanner servo motors 47 including the galvano motors 41a and 42a and the like on the basis of the rotation angle and the rotation speed. The generated driving information of the respective scanner servo motors 47 is output to the motor control unit 95.

The motor control unit 95 generated driving control data of the respective scanner servo motors 47 on the basis of the driving information output from the laser radiation point command unit 94 and drives the respective scanner servo motors 47 on the basis of the generated driving control data. The set made up of the laser radiation point command unit 94 and the motor control unit 95 corresponds to the laser radiation device controller 6.

Figure 7:
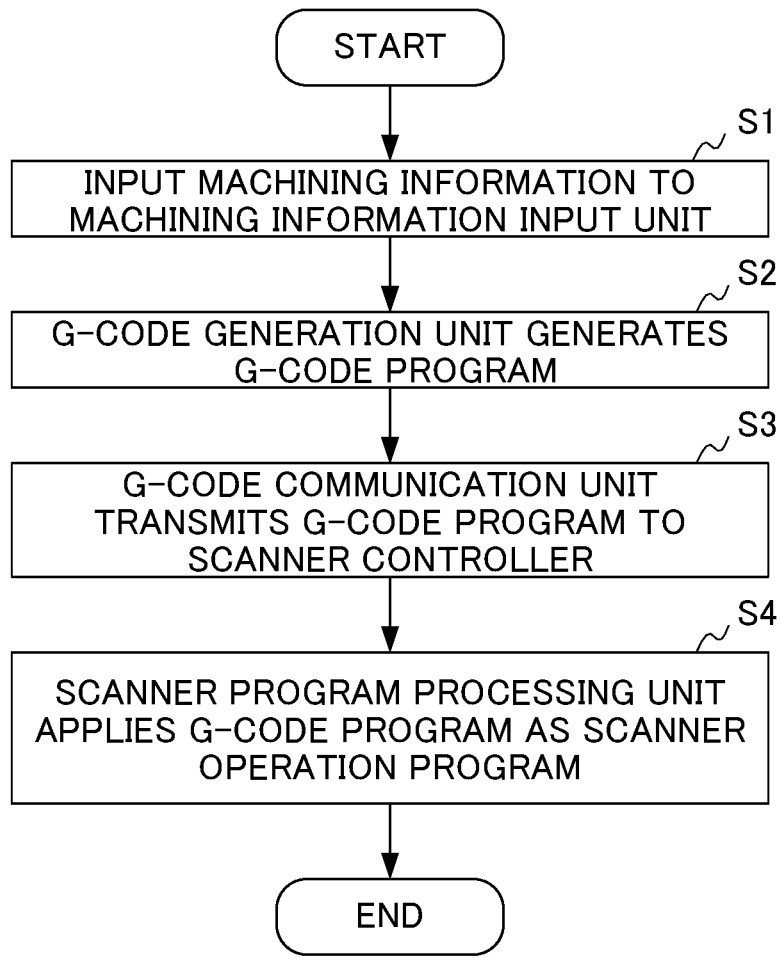
FIG. 7 is a diagram illustrating an operation flow of the laser machining robot system according to the first embodiment.

Next, the operation of the laser machining robot system 1 according to the first embodiment will be described with reference to the flowchart illustrated in FIG. 7.

In step S1, an operator inputs machining information into the machining information input unit 51 using the robot teaching operation board 8.

In step S2, the G-code generation unit 52 generates a G-code program using the machining information output from the machining information input unit 51.

In step S3, the G-code communication unit 53 transmits the generated G-code program to the scanner program processing unit 91 of the scanner controller 9.

In step S4, the scanner program processing unit 91 applies the G-code program received from the G-code communication unit 53 as a scanner operation program whereby the scanner controller 9 controls the laser oscillator 3 and the scanner servo motor 47.

Effects of First Embodiment

With the laser machining robot system 1 according to the first embodiment, it is possible to perform programming of a scanner operation from the robot teaching operation board 8 easily. In this way, since a robot program and a scanner program can be edited on the same robot teaching operation board 8, the system usability is improved. By using the template of the G-code program, it is possible to control a scanner operation related to laser machining easily by only inputting parameters for a desired machining shape rather than inputting the G-code program itself.

Second Embodiment

Figure 8:
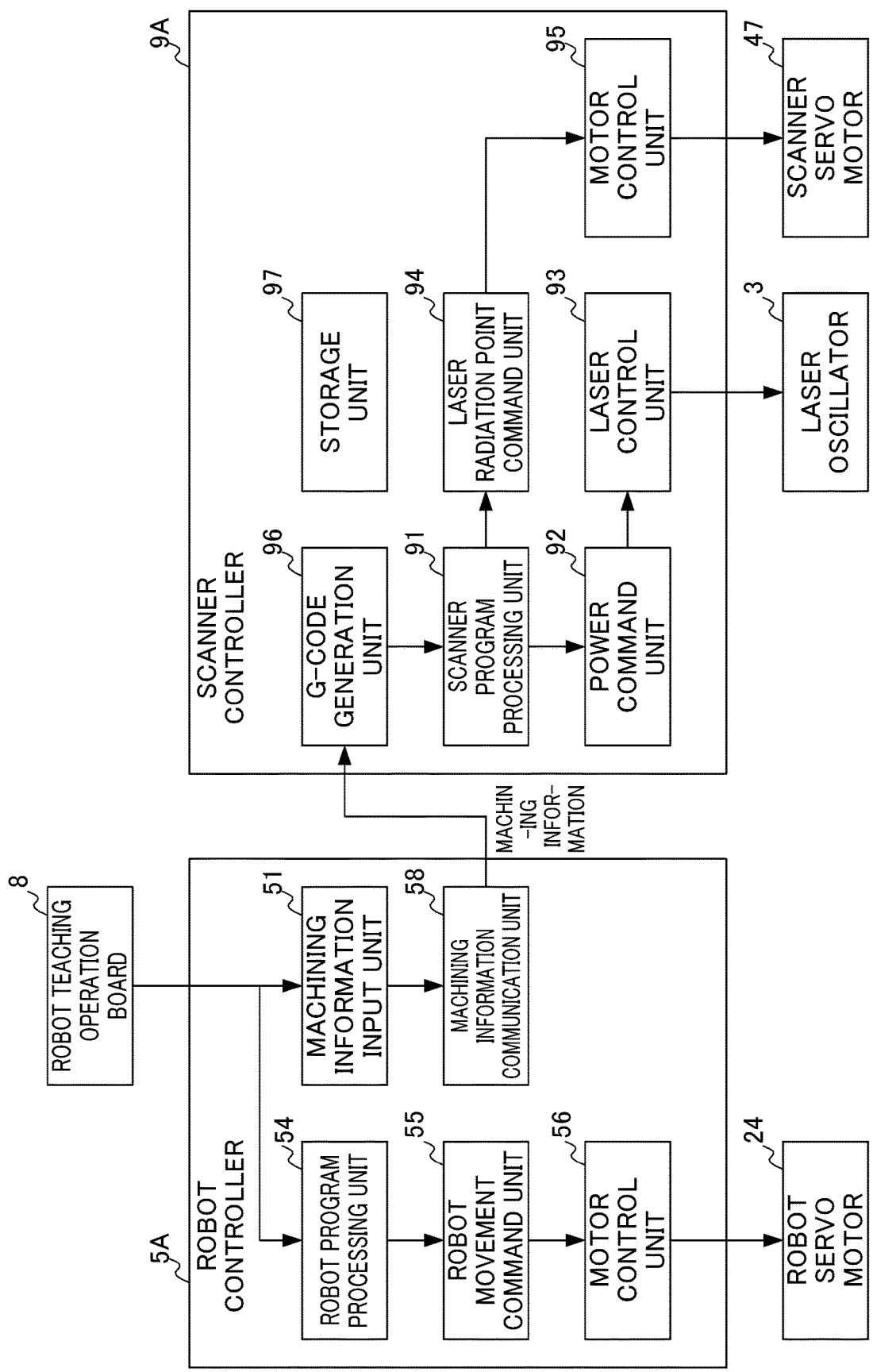
FIG. 8 is a block diagram illustrating a configuration of a robot controller and a scanner controller of a laser machining robot system according to a second embodiment.

Next, a robot controller 5A and a scanner controller 9A included in a laser machining robot system 1A according to a second embodiment of the present invention will be described with reference to a block diagram illustrated in FIG. 8. Hereinafter, components different from the components included in the robot controller 5 and the scanner controller 9 among the components included in the robot controller 5A and the scanner controller 9A will be mainly described.

The robot controller 5A does not include the G-code generation unit 52, the G-code communication unit 53, and the storage unit 57 unlike the robot controller 5 and instead includes a machining information communication unit 58. Moreover, the scanner controller 9A includes a G-code generation unit 96 and a storage unit 97 unlike the scanner controller 9.

The machining information communication unit 58 transmits machining information output from the machining information input unit 51 to the G-code generation unit 96 of the scanner controller 9A connected via a network to the robot controller 5. The transmission may use means such as FTP communication. The transmission of machining information may use digital signals. A method of transmitting machining information using digital signals will be described later:

The G-code generation unit 96 generates a G-code program using the machining information received from the machining information communication unit 58 similarly to the G-code generation unit 52 according to the first embodiment.

The storage unit 97 stores a G-code program prepared in advance as a template similarly to the storage unit 57. The G-code generation unit 96 can generate a G-code program by editing the template of a G-code program stored in the storage unit 97 when generating a G-code program using the machining information received from the machining information communication unit 58.

Next, a method of transmitting machining information using digital signals will be described in detail with reference to FIGS. 9A to 9D. When the robot controller 5A and the scanner controller 9A are connected by digital communication, the regions in which predetermined parameters can be defined, corresponding to the size (bytes) required for signal mapping, are defined.

Figure 9A:
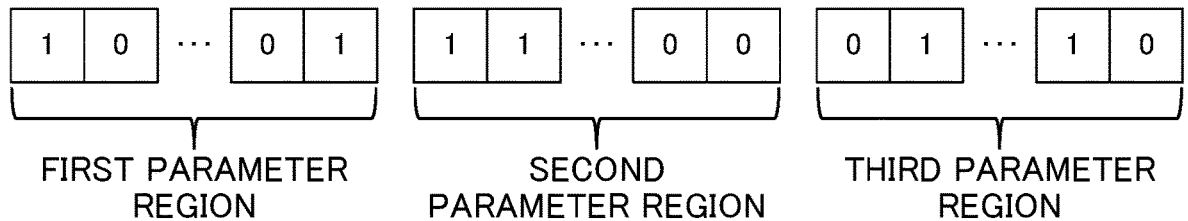
FIG. 9A is an example of a digital signal used in a machining information transmission method according to the second embodiment.

For example, as illustrated in FIG. 9A, a region in which a first parameter region to a fourth parameter region can be defined is secured. As illustrated in the table in FIG. 9A, a first parameter corresponds to a machining speed, a second parameter corresponds to a power command, a third parameter corresponds to a length, and a fourth parameter corresponds to a diameter. By doing so, respective parameter signals can be expressed as ON or OFF signals. The robot controller 5A operates the signals of the respective parameter regions on the basis of input machining information and transmits the signals to the scanner controller 9A. The scanner controller 9A can import input machining information by reading the signal state.

Figure 9B:
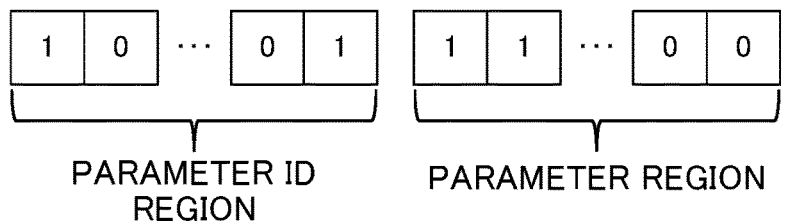
FIG. 9B is an example of a digital signal used in a machining information transmission method according to the second embodiment.

Alternatively, as illustrated in FIG. 9B, as a parameter expression method, data may be defined in a format of "parameter ID+parameter" rather than the format of the first parameter region to the fourth parameter region. Specifically, a region in which a parameter ID region and a parameter region can be defined is secured. Furthermore, as illustrated in the table in FIG. 9B, for example, a machining speed is defined in a parameter region when the parameter ID is 1, a power command is defined in a parameter region when the parameter ID is 2, a radius is defined in a parameter region when the parameter ID is 3, and a length is defined in a parameter region when the parameter ID is 4. For example, when information of a radius of 3 mm is transmitted, data communication is performed in a format of parameter ID=3 and parameter=3.0. With this method, the data size of digital signals for transmitting machining information can be minimized.

Figure 9C:
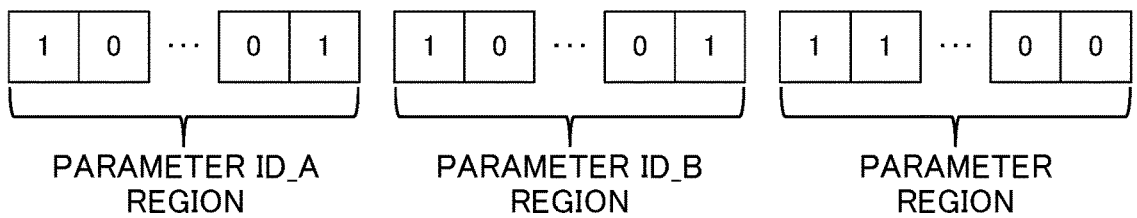
FIG. 9C is an example of a digital signal used in a machining information transmission method according to the second embodiment.
Figure 9D:
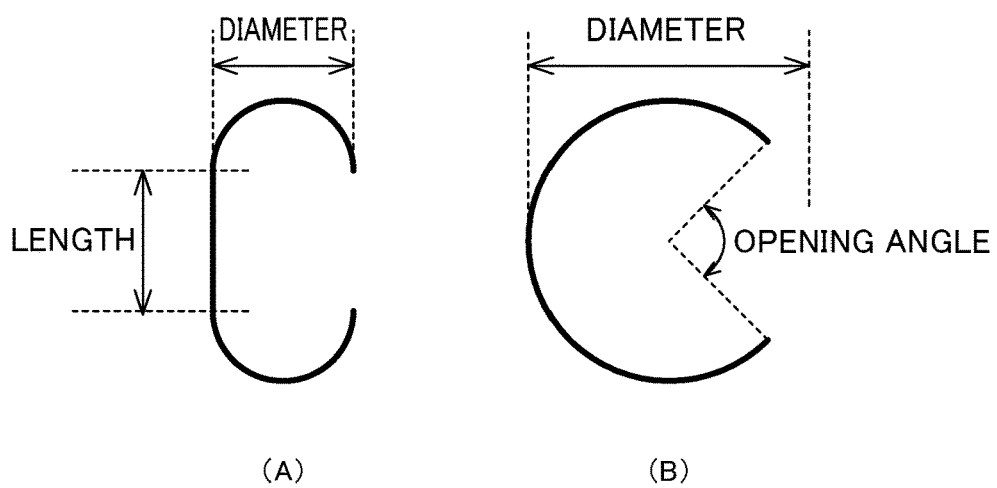
FIG. 9D is a diagram illustrating an example of a laser machining shape.

Alternatively, as illustrated in FIG. 9C, a plurality of parameter IDs may be used. For example, a parameter ID_A defines the format of a template of a machining shape, and a parameter ID_B defines a more detailed machining shape parameter based on the template of the machining shape. Specifically, as illustrated in the table in FIG. 9C, for example, a machining shape is defined as being a C-mark when the parameter ID_A is 1, and a machining shape is defined as being a circle when the parameter ID_B is 2. Furthermore, a machining speed is defined in a parameter region when the parameter ID_A is 1 and the parameter ID_B is 1. A power command is defined in a parameter region when the parameter ID_A is 1 and the parameter ID_B is 2. A diameter is defined. In a parameter region when the parameter ID_A is 1 and the parameter ID_B is 3. A length is defined in a parameter region when the parameter ID_A is 1 and the parameter ID_B is 4. A machining speed is defined in a parameter region when the parameter ID_A is 2 and the parameter ID_B is 1. A power command is defined. In a parameter region when the parameter ID_A is 2 and the parameter ID_B is 2. A diameter is defined in a parameter region when the parameter ID_A is 2 and the parameter ID_B is 3. An opening angle is defined in a parameter region when the parameter ID_A is 2 and the parameter is 4. For example, when a machining shape is a circle and information of the diameter being 5 mm is transmitted, data communication is performed in a format of parameter ID_A=2, parameter ID_B=3, and parameter=5.0. FIG. 9D illustrates specific locations of a machining shape corresponding to the diameter and the length of the C-mark and the diameter and the opening angle of the circle illustrated in the table in FIG. 9C.

Figure 10:
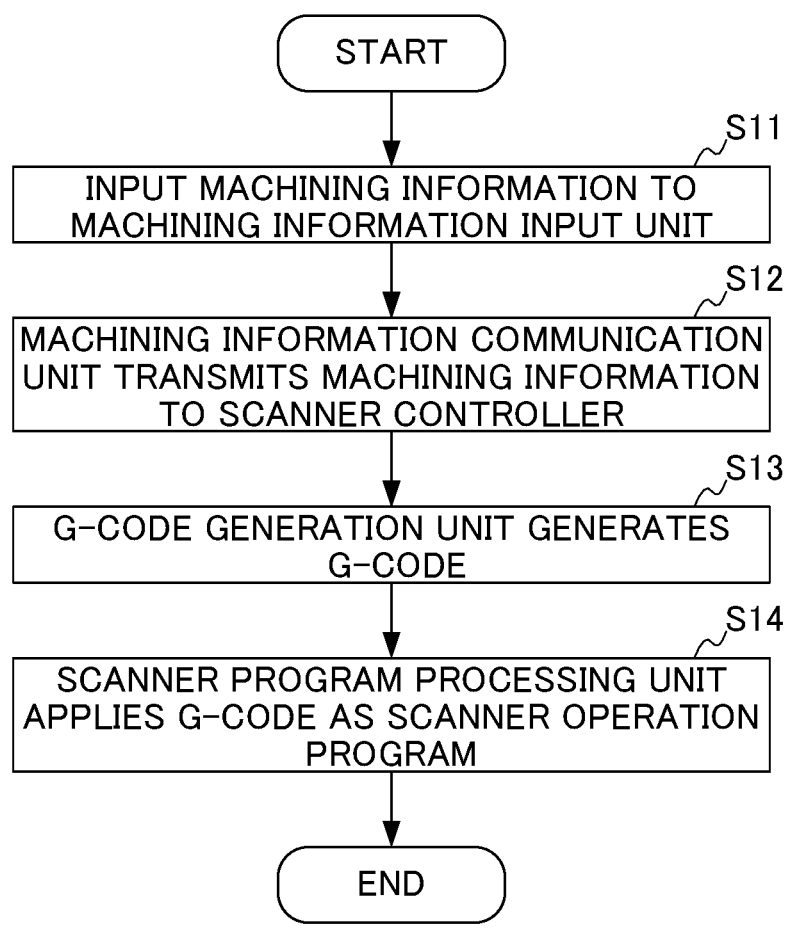
FIG. 10 is a diagram illustrating an operation flow of the laser machining robot system according to the second embodiment.

Next, an operation of the laser machining robot system 1A according to the second embodiment will be described with reference to the flowchart illustrated in FIG. 10.

In step S11, an operator inputs machining information to the machining information input unit 51 using the robot teaching operation board 8.

In step S12, the machining information communication unit 58 transmits the machining information output from the machining information input unit 51 to the G-code generation unit 96 of the scanner controller 9A.

In step S13, the G-code generation unit 96 generates a G-code program using the machining information received from the machining information communication unit 58.

In step S14, the scanner program processing unit 91 applies the G-code program received from the G-code generation unit 96 as a scanner operation program whereby the scanner controller 9 controls the laser oscillator 3 and the scanner servo motor 47.

Effects of Second Embodiment

The laser machining robot system 1A according to the second embodiment provides the same effects as the first embodiment.

Third Embodiment

Next, a robot controller 5B and a scanner controller 9B included in a laser machining robot, system 1B according to a third embodiment of the present invention will be described with reference to a block diagram illustrated in FIG. 11. Hereinafter, among the components included in the robot controller 5B and the scanner controller 9B, components different from those included in the robot controller 5 and the scanner controller 9 will be mainly described.

The robot controller 5B includes a robot program processing unit 54B instead of the robot program processing unit 54 unlike the robot controller 5.

The robot program processing unit 54B has a function of activating a scanner program of the scanner controller 9B via a network between the robot controller 5B and the scanner controller 9B in addition to the function of the robot program processing unit 54. When the scanner controller 9B has a plurality of scanner programs, the robot program processing unit 54B selects a specific scanner program from the plurality of scanner programs and activates the selected scanner program. These scanner programs are generated in advance prior to activation from the robot program processing unit 54B.

FIG. 12 illustrates an example of a robot program processed by the robot program processing unit. 54B. In the step on the first line, when the laser radiation device 4 of the robot. 2 moves to a first position, the robot program processing unit 54B transmits a signal for activating a G-code program of [CIRCLE01] to the scanner controller 9C. The scanner controller 9C activates the G-code program of [CIRCLE01] and performs laser machining. In parallel with this laser machining, the program processing proceeds to the step on the second line, and the laser radiation device 4 of the robot 2 moves to a second position.

Similarly, in the step on the third line, when the laser radiation device 4 of the robot 2 moves to a third position, the robot program processing unit 54B transmits a signal for activating a G-code program of [CIRCLE02] to the scanner controller 9C. The scanner controller 9C activates the G-code program of [CIRCLE02] and performs laser machining. In parallel with this laser machining, the program processing proceeds to the step on the fourth line and the laser radiation device 4 of the robot 4 moves to a fourth position.

Figure 11:
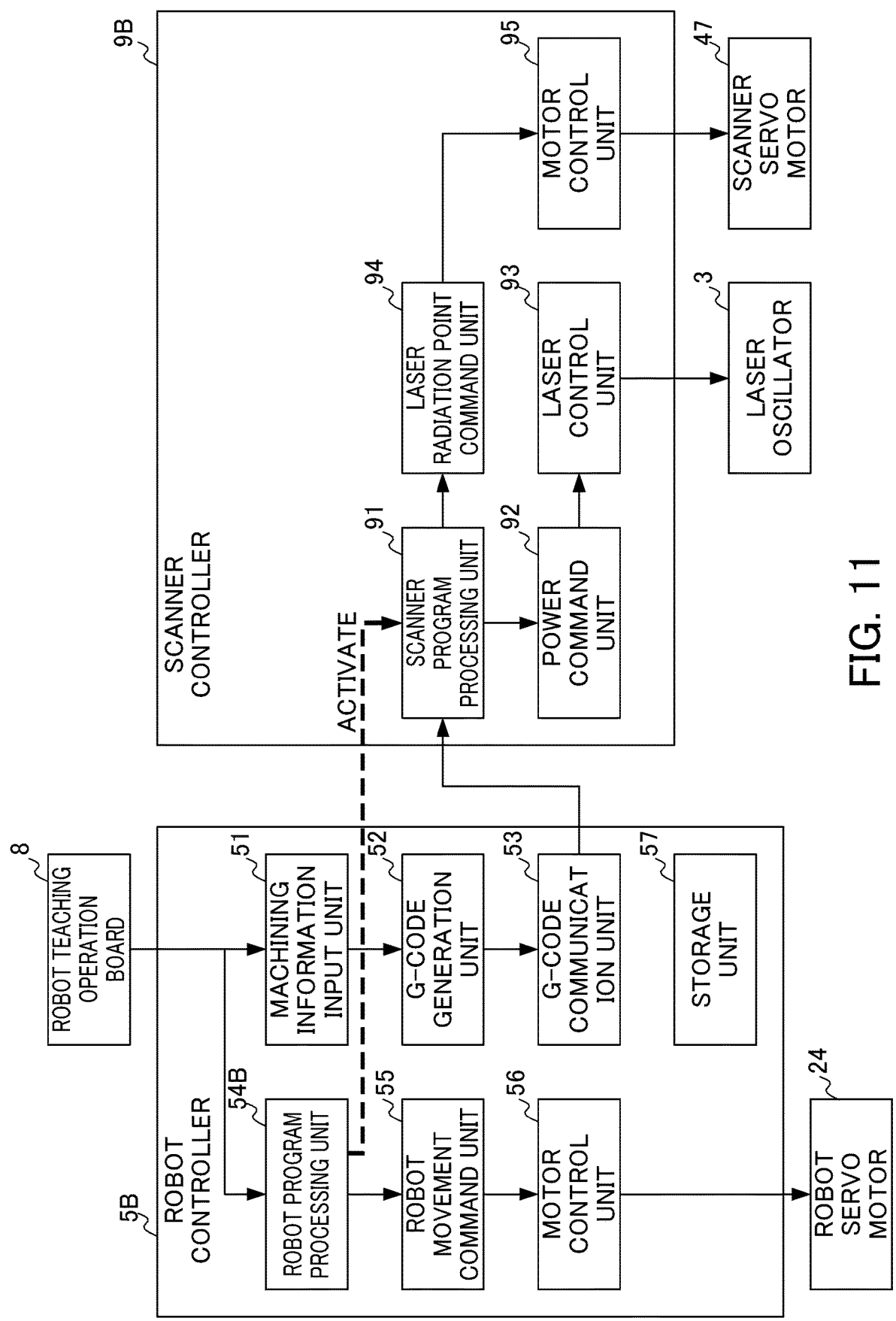
FIG. 11 is a block diagram illustrating a configuration of a robot controller and a scanner controller of a laser machining robot system according to a third embodiment.

In the configuration illustrated in FIG. 11, the robot program processing unit 54 among the components of the robot controller 5 according to the first embodiment is replaced with the robot program processing unit 54B, and the present invention is not limited thereto. Specifically, the laser machining robot system 1B according to the present embodiment may have a configuration in which the robot program processing unit 54 among the components of the robot controller 5A according to the second embodiment is replaced with the robot program processing unit 54B.

Effects of Third Embodiment

The laser machining robot system 1B according to the third embodiment provides the same effects as the first and second embodiments. Furthermore, the laser machining robot system 1B can select a scanner program within a robot program and activate the scanner program. In this way, for example, an operation of the robot servo motor 24 and an operation of the laser oscillator 3 and/or the scanner servo motor 47 can be associated with each other.

[Modification]

Figure 13:
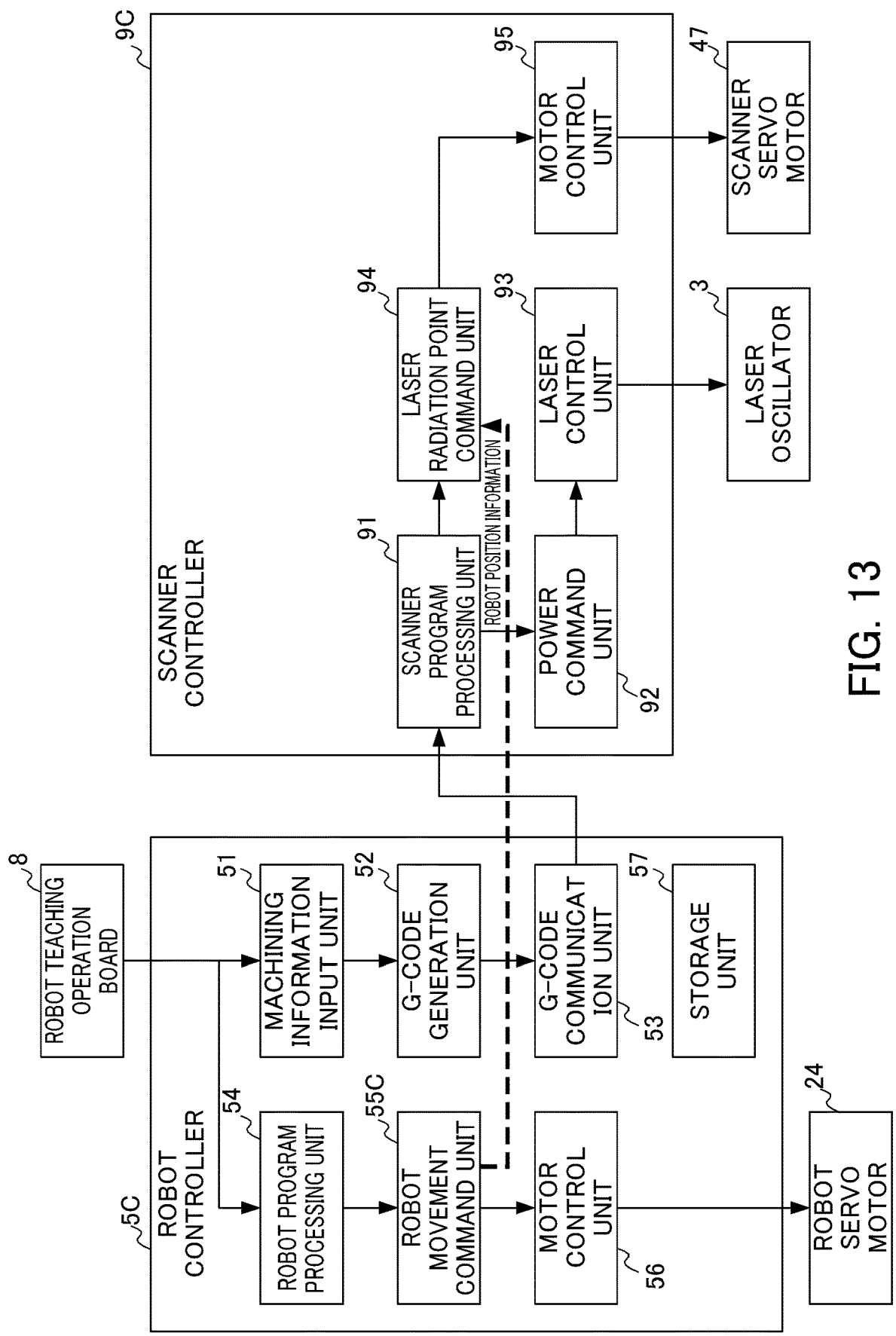
FIG. 13 is a block diagram illustrating a configuration of a robot controller and a scanner controller of a laser machining robot system according to a modification.

FIG. 13 illustrates a configuration of a robot controller 5C and a scanner controller 9C included in a laser machining robot system 1C according to a modification of the present invention.

The robot controller 5C includes a robot movement command unit 55C instead of the robot movement command unit 55 according to the first to third embodiments.

The robot movement command unit 55C sequentially transmits the position information. (or the operation information) of the robot 2 to the laser radiation point command unit 94 of the scanner controller 9C during laser machining. The laser radiation point command unit 94 of the scanner controller 9C corrects a laser radiation position according to the position information (or the operation information) received by the robot movement command unit 55C.

Figure 14:
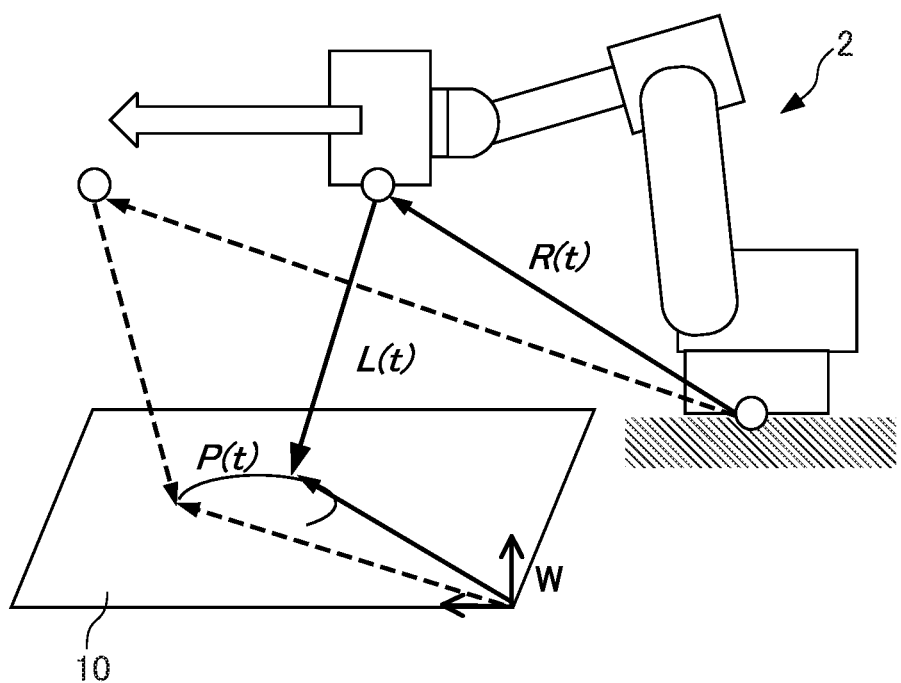
FIG. 14 is a diagram illustrating a relationship between a robot path, a machining path on a work coordinate system, and a laser radiation path of a scanner.

More specifically, as illustrated in FIG. 14, when R(t) is a matrix indicating the path of the robot 2 defined within a robot program, W is a matrix indicating a work coordinate system, and P(t) is a matrix indicating a machining path on the work coordinate system defined within a scanner program, a laser radiation path L(t) of a scanner is expressed as below.

$$L(t)=R(t)^{-1}\cdot W\cdot P(t)$$

In the configuration illustrated in FIG. 11, the robot movement command unit 55 among the components of the robot controller 5 according to the first embodiment is replaced with the robot movement command unit 55C, and the present invention is not limited thereto. Specifically, the laser machining robot system 1C according to this modification may have a configuration in which the robot movement command unit 55 among the components of the robot controller 5A according to the second embodiment is replaced with the robot movement command unit 55C. Alternatively, the laser machining robot system 1C according to this modification may have a configuration in which the robot movement command unit 55 among the components of the robot controller 5B according to the third embodiment is replaced with the robot movement command unit 55C.

With this modification, the robot. 2 can perform laser machining as designated by a scanner program while the robot 2 is moving.

Whale embodiments of the present invention have been described, the present invention is not limited to the above-described embodiments. The advantages described in the present embodiments are examples of the most preferable advantages obtained from the present invention, and the advantages of the present invention are not limited to those described in the Present embodiments.

The control method by the robot controller 5, 5A, 5B, or 5C and the scanner controller 9, 9A, 9B, or 9C realized by software. When the control method is realized by software, programs that form the software are installed in a computer (the robot controller 5, 5A, 5B, or 5C and the scanner controller 9, 9A, 9B, or 9C). Moreover, these programs may be recorded on a removable medium and distributed to users and may also be distributed by being downloaded to users' computers via a network. Furthermore, these programs may be provided to users' computers (the robot controller 5, 5A, 5B, or 5C and the scanner controller 9, 9A, 9B, or 9C) as a Web service via a network without being downloaded.

EXPLANATION OF REFERENCE NUMERALS 1, 1A, 1B, 1C: Laser machining robot system
2: Robot
3: Laser oscillator
4: Laser radiation device
5, 5A, 5B, 5C: Robot controller
6: Laser radiation device controller
7: Laser oscillator controller
8: Robot teaching operation board
9, 9A, 9B, 9C: Scanner controller
24: Robot servo motor
47: Scanner servo motor
51: Machining information input unit
52, 96: G-code generation unit
53: G-code communication unit
54, 54B: Robot program processing unit
57, 97: Storage unit
58: Machining information communication unit
91: Scanner program processing unit

What is claimed is:

1. A laser machining robot system comprising:
a robot controller that controls a robot that performs remote laser machining; and
a scanner controller that controls a scanner, wherein the robot controller includes:
a first memory; and
a first processor, wherein the first processor executes a program stored in the first memory to perform operations comprising:
inputting machining information which includes parameters unique to a machining target shape when performing the remote laser machining;
generating a G-code program using the machining information; and
transmitting the G-code program to the scanner controller, and the scanner controller includes:
a second memory; and
a second processor, wherein the second processor executes a program stored in the second memory to perform scanner operations comprising:
applying the G-code program as a scanner operation program for operating the scanner.

2. The laser machining robot system according to claim 1, wherein
the robot controller further includes a storage unit that stores a template program, and
a G-code generation unit generates the G-code program by editing the template program stored in the storage unit using the machining information.

3. The laser machining robot system according to claim 1, wherein
the robot controller further includes a robot program processing unit that executes a robot operation program for operating the robot, and
the robot program processing unit selects the scanner operation program included in the scanner controller and activates the scanner operation program selected.

4. A laser machining robot system comprising:
a robot controller that controls a robot that performs remote laser machining; and
a scanner controller that controls a scanner, wherein the robot controller includes:
a first memory; and
a first processor, wherein the first processor executes a program stored in the first memory to perform controller operations comprising:
inputting machining information which includes parameters unique to a machining target shape when performing the remote laser machining; and
transmitting the machining information to the scanner controller, and the scanner controller includes:
a second memory; and
a second processor, wherein the second processor executes a program stored in the second memory to perform operations comprising:
generating a G-code program using the machining information; and
applying the G-code program as a scanner operation program for operating the scanner.

5. The laser machining robot system according to claim 4, wherein
the scanner controller further includes a storage unit that stores a template program, and
a G-code generation unit generates the G-code program by editing the template program stored in the storage unit using the machining information.

* * * * *